(12) United States Patent
Pisharody et al.

(10) Patent No.: US 9,197,693 B1
(45) Date of Patent: Nov. 24, 2015

(54) SYSTEM AND METHOD FOR LOAD DISTRIBUTION USING A MAIL BOX PROXY OF A VIRTUAL PRIVATE NETWORK

(75) Inventors: Vinod Pisharody, Milpitas, CA (US); Guang Yang, Beijing (CN); Xia Zhifeng, Beijing (CN)

(73) Assignee: ARRAY NETWORKS, INC., Milpitas, CA (US)

( * ) Notice: Subject to any disclaimer, the term of this patent is extended or adjusted under 35 U.S.C. 154(b) by 1929 days.

(21) Appl. No.: 11/437,475

(22) Filed: May 19, 2006

(51) Int. Cl.
H04L 29/08 (2006.01)

(52) U.S. Cl.
CPC ........... *H04L 67/06* (2013.01); *H04L 29/08072* (2013.01)

(58) Field of Classification Search
CPC . H04L 63/20; H04L 67/2828; H04L 67/2852; H04L 63/08; H04L 67/2876; H04L 63/0272; H04L 67/06; H04L 41/026; H04L 65/4023; H04W 12/06; Y10T 307/461
USPC ..................................... 709/206, 207; 726/15
See application file for complete search history.

(56) References Cited

U.S. PATENT DOCUMENTS

| 6,393,459 | B1 * | 5/2002 | Lurndal | 709/203 |
|---|---|---|---|---|
| 2001/0044736 | A1 * | 11/2001 | Jacobs et al. | 705/7 |
| 2002/0147652 | A1 * | 10/2002 | Gheith et al. | 705/26 |
| 2002/0198948 | A1 * | 12/2002 | Lin | 709/206 |
| 2004/0059735 | A1 * | 3/2004 | Gold et al. | 707/100 |
| 2004/0153558 | A1 * | 8/2004 | Gunduc et al. | 709/229 |
| 2005/0039048 | A1 * | 2/2005 | Tosey | 713/201 |
| 2005/0097180 | A1 * | 5/2005 | Abdelhak | 709/208 |
| 2005/0193064 | A1 * | 9/2005 | Hales | 709/206 |
| 2005/0240773 | A1 * | 10/2005 | Hilbert et al. | 713/182 |
| 2005/0289072 | A1 * | 12/2005 | Sabharwal | 705/59 |
| 2006/0005240 | A1 * | 1/2006 | Sundarrajan et al. | 726/15 |
| 2006/0106866 | A1 * | 5/2006 | Green et al. | 707/104.1 |
| 2007/0005702 | A1 * | 1/2007 | Tokuda et al. | 709/206 |
| 2007/0168430 | A1 * | 7/2007 | Brun et al. | 709/206 |
| 2007/0253387 | A1 * | 11/2007 | Crampton | 370/338 |
| 2011/0145150 | A1 * | 6/2011 | Onischuk | 705/50 |
| 2013/0085815 | A1 * | 4/2013 | Onischuk | 705/12 |
| 2014/0231512 | A1 * | 8/2014 | Onischuk | 235/386 |
| 2014/0365281 | A1 * | 12/2014 | Onischuk | 705/12 |
| 2015/0012339 | A1 * | 1/2015 | Onischuk | 705/12 |

* cited by examiner

*Primary Examiner* — Sargon Nano
(74) *Attorney, Agent, or Firm* — Buchanan Ingersoll & Rooney PC

(57) ABSTRACT

A system for load distribution using a mail proxy, which includes a client, a public network, and an Internet service provider (ISP) network, and a plurality of e-mail servers. The Internet service provider (ISP) network includes a virtual private network (VPN) device, which is configured to prevent unauthorized access to a private network. The VPN device also includes a mail proxy and an authentication and authorization module or service capable of at least the following: validating credentials of the client, and identifying at least one outgoing e-mail server and at least one incoming e-mail server for each client. The plurality of e-mail servers include a plurality of outgoing e-mail servers and a plurality of incoming e-mail servers.

23 Claims, 4 Drawing Sheets

SYSTEM AND METHOD FOR LOAD DISTRIBUTION USING A MAIL BOX PROXY OF A VIRTUAL PRIVATE NETWORK

FIELD OF THE INVENTION

This invention generally relates to a system and method of load distribution using a mail proxy of a virtual private network (VPN) device, and more particularly a system and method of load distribution using a mail proxy of a virtual private network device with a plurality of e-mail servers.

BACKGROUND OF THE INVENTION

One of the most utilized networks for interconnecting distributed computer systems is the Internet. The Internet allows users of computer systems to exchange data throughout the world. In addition, many private networks in the form of corporate or commercial networks are connected to the Internet. These private networks are typically referred to as an "intranet." To facilitate data exchange, the intranet generally uses the same communication protocols as the Internet. These Internet protocols (IP) dictate how data is formatted and communicated. In addition, access to corporate network or intranets is normally controlled by network gateways having a multi-layer SSL firewall system, which includes a networking architecture where the flow (associated streams of packets) are inspected both to and from the corporate network. The multi-layer SSL firewall systems are often referred to a virtual private network (VPN) gateway, such as those sold by Array Networks of Milpitas, Calif.

As the popularity of the Internet grew, businesses turned to it as a means of extending their own networks. First came intranets, which are password-protected sites designed for use only by company employees. Now, many companies are creating their own VPN (virtual private network) to accommodate the needs of remote employees and distant offices. A VPN is a private network that uses a public network (usually the Internet) to connect remote sites or users together. Instead of using a dedicated, real-world connection such as leased line, a VPN uses "virtual" connections routed through the Internet from the company's private network to the remote site or employee.

The VPN devices are able to prevent tampering with private resources by unauthorized users using an authentication, authorization and accounting/auditing system known as AAA. The VPN device can also restrict and track the movement of data from inside the VPN device to systems outside the VPN device. The operation of the VPN device is determined by security policies, as contained within the authentication and authorization server or an AAA server. The authentication and authorization (or AAA) servers are used for more secure access in a remote-access VPN environment. When a request to establish a session comes in from a dial-up client, the request is proxied via an authentication and authorization module or service within the VPN device to the authentication and authorization or (AAA) server. The authentication and authorization (AAA) server will check: who you are (authentication); what you are allowed to do (authorization); and what you are actually doing (accounting/auditing). Accounting information is typically used in tracking client use for security auditing, billing or reporting purposes.

In addition, the market demand for managed e-mail services has grown rapidly in recent years. Although e-mail is typically not the core activity of their business, e-mail is critically important to any corporation these days. With the rapid pace of technological changes and constant increases in usage, e-mail is becoming more and more difficult to manage. In house e-mail solutions are costly and labor intensive, and very often, corporations do not have the resources or the expertise to stay current with the latest technology developments. In addition, managed e-mail services can dramatically reduce corporations' operating expenses and boost their efficiency.

Typically, corporate e-mails are encrypted through an e-mail client software on an end user's computer, travels through the public Internet securely, and then terminates on a VPN device in the Internet Service Provider (ISP). The VPN device generates an AAA request to the AAA infrastructure or server for negotiating credentials. After the AAA responses are generated by a RADIUS/LDAP/LocalDB/AD infrastructure, clear text e-mails are exchanged between backend e-mail servers and the VPN device, which then encrypts the e-mail and sends them across the public Internet to the end user. Typically, a VPN device will include a mail proxy, which serves as an intermediary between the e-mail client or end user (i.e., Outlook Express) and the e-mail servers within the ISP network. Accordingly, it would be desirable for the mail proxy of the VPN gateway to perform intelligent load distribution for improved performance and maintenance of the e-mail servers.

SUMMARY OF THE INVENTION

In accordance with one embodiment, a system for load distribution using a mail proxy comprising: a client; a public network; an Internet service provider (ISP) network, the ISP network comprising: a virtual private network (VPN) device, wherein the VPN device prevents unauthorized access to a private network, the VPN device comprising: a mail proxy having an authentication and authorization module, which performs at least the following: validating credentials of the client; and routing e-mail requests of the client to and from at least one outgoing e-mail server and at least one incoming e-mail server; and a plurality of e-mail servers, and wherein the plurality of e-mail servers comprise a plurality of outgoing e-mail servers and a plurality of incoming e-mail servers.

In accordance with another embodiment, a virtual private network device having enhanced load distribution using a mail proxy, the device comprising: an mail proxy adapted to receive and distribute SSL and clear-text e-mails between an e-mail client and an e-mail server, the e-mail server comprising a plurality of outgoing e-mail servers and a plurality of incoming e-mail servers; and an authentication, authorization and accounting server, the authentication, authorization and accounting server having a database, which includes: authentication and authorization credentials; and information regarding at least one outgoing e-mail server, and at least one incoming mail server for each client.

In accordance with a further embodiment, a method of load distribution for a virtual private network comprising: receiving an encrypted e-mail request from a client having a set of credentials; directing the e-mail request via a mail proxy to an authentication and authorization module within the mail proxy, wherein the authentication and authorization module: validates the set of credentials of the client; and routes an e-mail requests of the client to and from at least one outgoing e-mail server and at least one incoming e-mail server based on database stored within the authentication and authorization server; decrypting an outgoing e-mail and sending the e-mail to the client via an outgoing e-mail server; and encrypting incoming e-mails from an incoming mail server and sending the e-mail to at least one e-mail server.

In accordance with another embodiment, a method of load distribution using a mail proxy of a virtual private network (VPN) device comprising: inputting into an authentication and authorization database an IP address and Port for IMAP and SMTP access for at least one client; and directing e-mail request to one of a plurality of e-mail servers based on the authentication and authorization database to at least one of a plurality of e-mail servers, wherein the database provides the IP and Port of an IMAP and a SMTP server for the at least one client.

BRIEF DESCRIPTION OF THE DRAWINGS

The invention will now be described in greater detail with reference to the preferred embodiments illustrated in the accompanying drawings, in which like elements bear like reference numbers, and wherein.

DETAILED DESCRIPTION

Figure 1:
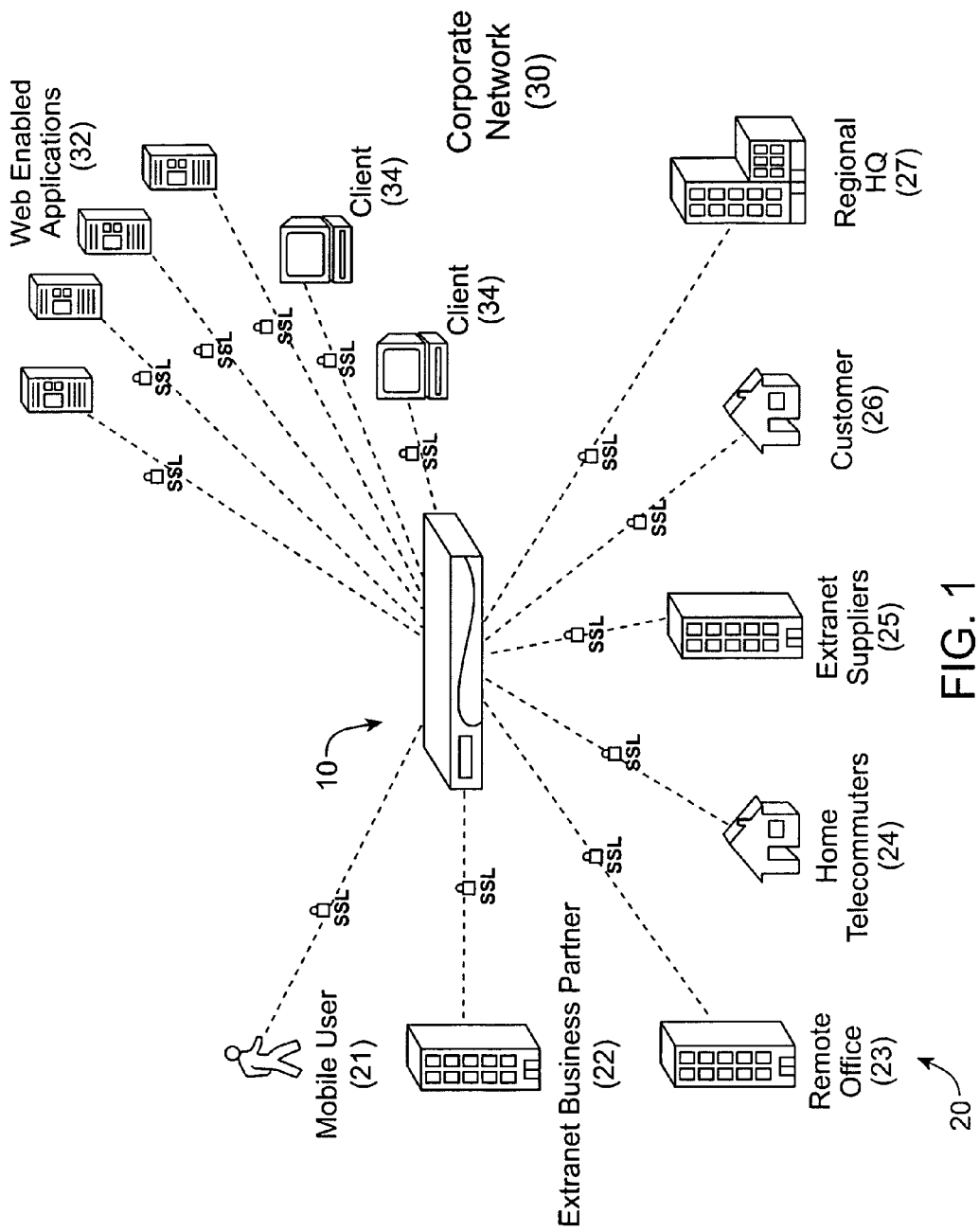
FIG. 1 shows a schematic diagram of a virtual private network (VPN) device in use according to one embodiment.

FIG. 1 shows a schematic diagram of a virtual private network (VPN) device 10, or VPN gateway, in accordance with one embodiment. As shown in FIG. 1, the VPN device 10 is configured to accommodate the needs of remote users 20 to access web enabled applications 32, within a corporate network 30. Typically, within the corporate network 30, remote users 20 via the VPN device 10 will have direct access to web enabled applications 32, which can include e-mail and other resources. In addition, these web-enabled applications 32 can be available to clients 34 within the network 30. As shown in FIG. 1, the remote users 20 can include mobile users 21, extranet business partners 22, remote offices 23, home telecommuters 24, extranet suppliers 25, customers 26, and regional headquarters 27, which are only some of the remote users 20 who may access the corporate network 30 via the VPN device 10.

Figure 2:
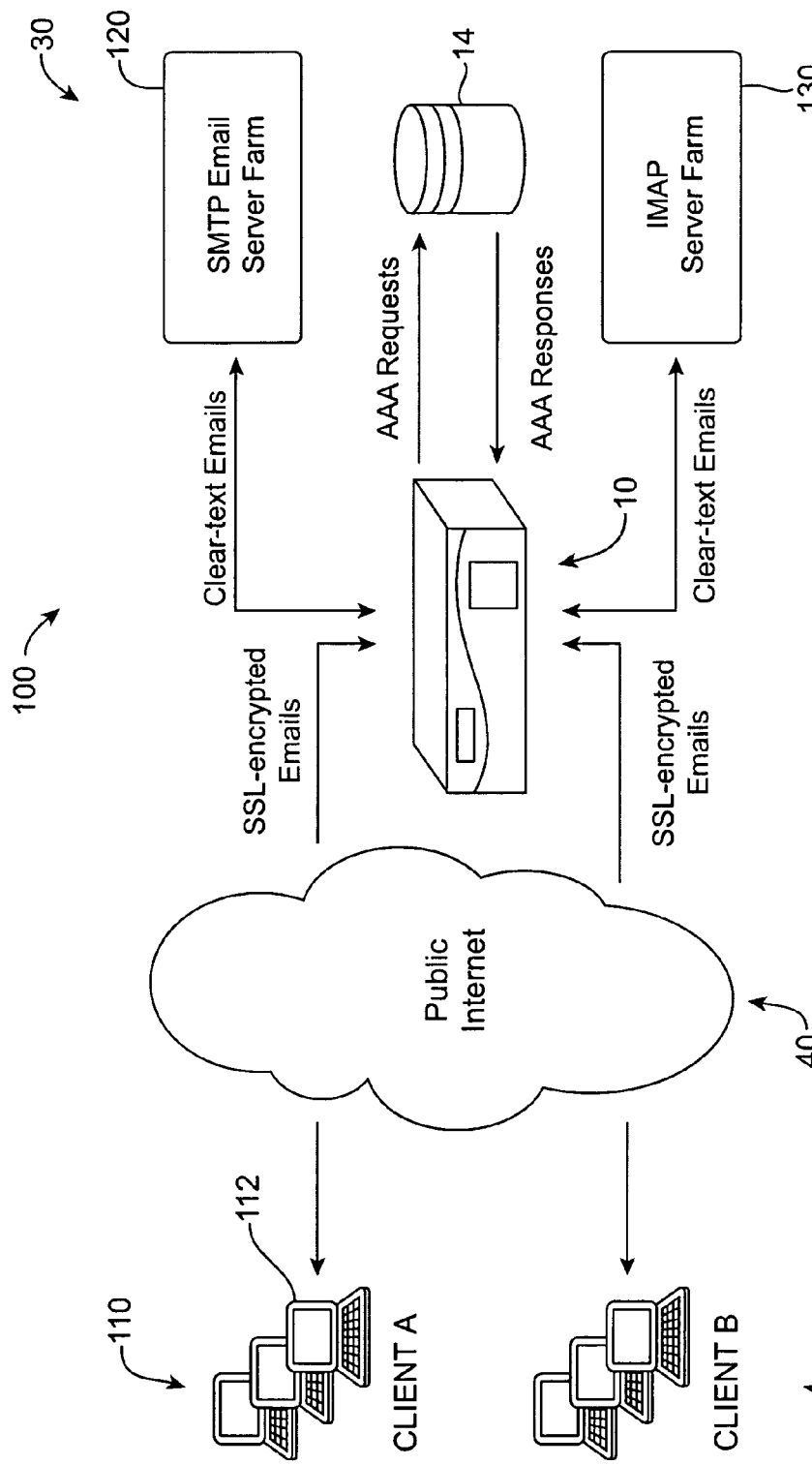
FIG. 2 shows a schematic diagram of a virtual private network device and an internet service provide network according to another embodiment.

FIG. 2 shows a schematic diagram of a virtual private network device 10, a public network or communications link, such as the Internet 40, and an internet service provider (ISP) network or infrastructure 100 for managed e-mail services according to one embodiment. The remote users 20 and/or clients (client A or client B) 110 can access an e-mail server 120, 130 on the corporate network 30 via the ISP network 100. The remote user 20 and/or client 110 can be a computer or other suitable device for retrieving e-mails, including PDAs, cellular phones, Blackberry® type devices and other wireless devices. The ISP network 100, as shown in FIG. 2, can include a VPN device 10 (also known as a gateway) having a mail proxy 12 (FIG. 3), which acts as an intermediary between the remote user 20 and/or client 110, and the e-mail servers 120, 130.

As shown in FIG. 2, the remote user 20 accesses the ISP network 100 and corporate network 30 via the VPN device 10. In use, the remote users 20 can access e-mail from both local and remote locations via a mail proxy 12, which is a module that is included within the VPN device 10. The mail proxy 12 is an intermediary between an e-mail client or client device 110 of a remote user 20, such as Outlook Express, etc. that uses a cryptographic protocol such as secure sockets layer (SSL) or transport layer security (TLS) to provide a secure communication line on the Internet 40. When the remote user 20 establishes an e-mail session via a mail proxy 12, the remote user 20 or e-mail client 110 establishes a tunnel using the SSL protocol, which requires that the user authenticate via an authentication/authorization server 14 associated with the VPN device 10.

It can be appreciated that the authentication/authorization server 14 can be an authentication, authorization, and accounting (or auditing) server 14 (also known as an "AAA"), which typically includes a set of authentication interfaces, to which the VPN device 10 integrates easily. The AAA server 14 can be any suitable server or authentication database, including but not limited to an external LDAP, Microsoft Active Directory, RADIUS, RSA SecurID server or a local authentication database. In addition, the mail proxy 12 preferably includes an authentication and authorization module or service, which validates the credentials of the client 110, and routes the e-mail requests of the client 110 to at least one outgoing e-mail server 120 and at least one incoming e-mail server 130.

For an additional level of protection, the VPN device 10 supports authentication that identifies clients 110 and associates them with user sessions based on unique certificates. The authorization role provides the VPN device 10 with a regulation for the security policy. Typically, the VPN device 10 allows administrators to limit access to information and applications based on a remote user's role within the organization. However, policies are typically flexible enough to meet the most complex requirements while allowing changes and updates to be applied quickly and easily. Accordingly, to minimize integration complexity, the VPN device 10 allows policies to be stored locally as well as on an external server (not shown), and allows administrators to compare external information with locally stored policies. In addition, the authentication and authorization server (AAA) 14 can include an extensive audit trail, which can be a primary requirement for all security related regulations and policies. Typcially, the VPN device 10 generates audit information in formats that allow easy analysis for both security and status monitoring purposes.

As shown in FIG. 2, an e-mail system of an ISP network 100 consists of a plurality of e-mail servers 120, 130 having a unique IP (Internet protocol) address and ports. As referenced herein, the port of each specific e-mail server 120, 130 is a number ranging from 0-65535, recognized by the TCP (Transmission Control Protocol) and UDP (Transmission Control Protocol) protocols. However, it can be appreciated that other protocols, which map incoming data to a particular process running on a server can be used.

The plurality of e-mail servers 120, 130 comprise an outgoing mail server 120, preferably in the form of a SMTP server, (Simple Mail Transfer Protocol), and an incoming mail server 130, preferably in the form of an IMAP (Internet Mail Access Protocol) or POP3 (Post Office Protocol) server. The sending and receiving of e-mail by the remote user 20 via the client or client device 110, and the mail proxy 12 of the VPN device 10 via the internet 40 is preferably in the form of an SSL-encrypted e-mail. However, it can be appreciated that any suitable encryption protocol can be used including but not limited to PGP (Pretty Good Privacy) and S/MIME (Secure/Multipurpose Internet Mail Extensions).

Upon the receipt of an e-mail from the client device 110, the mail proxy 12 of the VPN device 10 converts the SSL-encrypted e-mail to a clear-text e-mail which is send to the outgoing mail server 120. Similarly, the incoming mail server 130 sends incoming e-mails in clear text to the mail proxy 12, which then encrypts the e-mail and sends it to the client 110. In addition, to supporting IMAP and SMTP protocols, the mail proxy 12 can provide for offloading of the authentication of remote users 20 to the AAA server 14 via the authentication and authorization module within the mail proxy 12.

In order for a client 110 to send an e-mail on the corporate network 30, the client 110 generates a SSL-encrypted e-mail through e-mail client software on the remote or end user's 20 computer, which travels through the public internet 40 securely, and then terminates on the VPN device 10 in the ISP network 100. The VPN device 10 generates an authentication, authorization and accounting/auditing (AAA) request to the authentication and authorization server 14, which negotiates the credentials of the remote user 20. It can be appreciated that the credentials of remote users 20 can vary depending on the remote user 20 and that some, all or none of the web enabled applications 32 within the corporate network 30 can be accessed by the remote user 20. Once the authentication and authorization server 14 has approved the remote user's 20 credentials, the authentication and authorization server 14 generates a response, and the clear-text e-mails are exchanged between an outgoing server 120 and/or an incoming server 130 and the VPN device 10. The VPN device 10 encrypts the e-mails and sends them across the public Internet 40 to the remote user's 20 computer 112.

Figure 3:
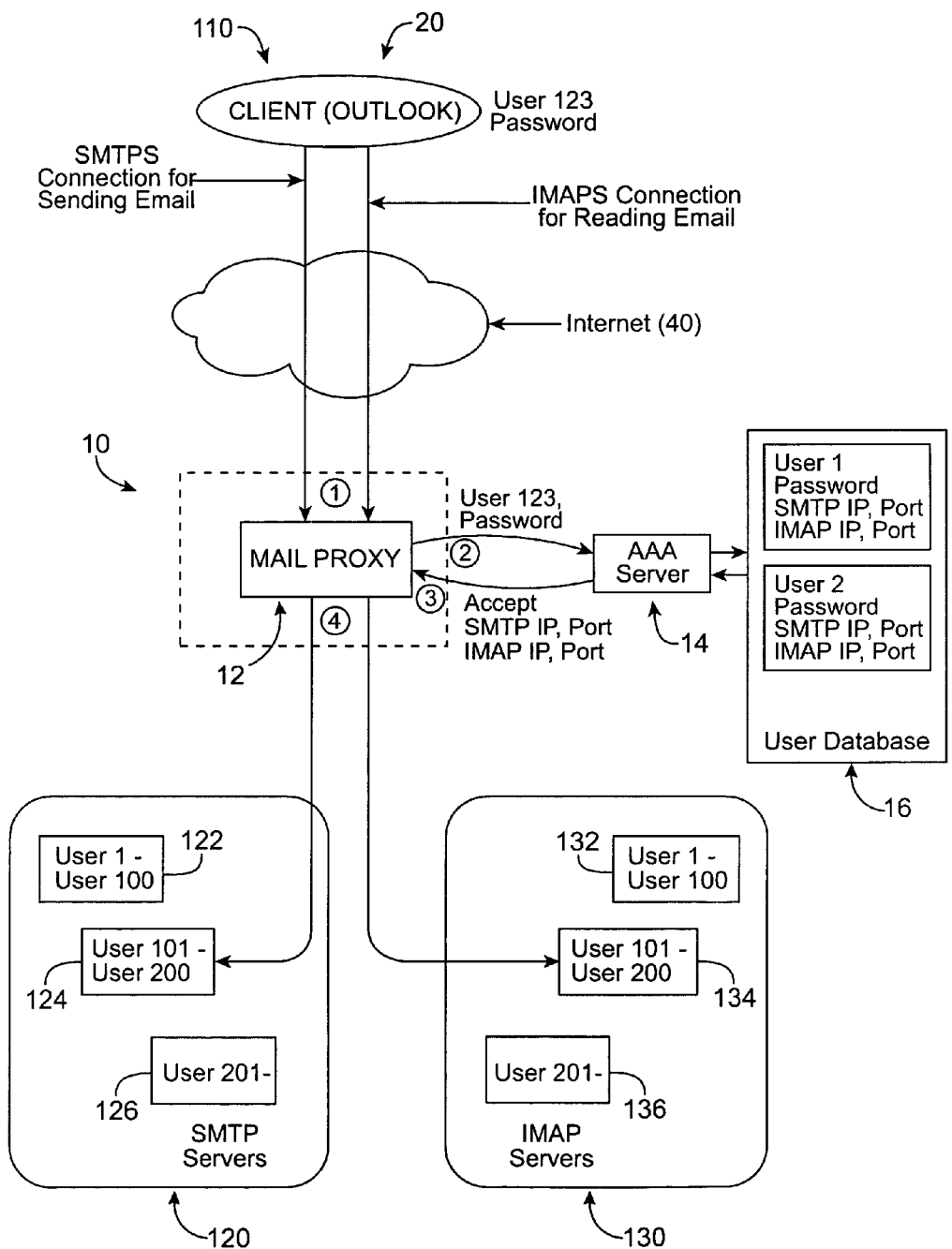
FIG. 3 shows a schematic diagram of a system and method for load distribution using a mail proxy of a virtual private network device according to a further embodiment.

FIG. 3 shows a schematic diagram of a load distribution system and method using a mail proxy 12 of a VPN device 10 according to a further embodiment. As shown in FIG. 3, the load distribution system includes a client device 110 having a personal information manager, or e-mail application, such as Microsoft Outlook from Microsoft, the internet 40, a VPN device 10 having a mail proxy 12 and an authentication and authorization server 14, a plurality of outgoing e-mail servers 120, and a plurality of incoming e-mail servers 130. The authentication and authorization server 14 can also include a centralized authentication or authorization/user database 16 for each remote user 20 and/or client or client device 110, including password, incoming mail server 130 information (e.g. SMTP: IP address, Port), and outgoing mail server 120 information (e.g. IMAP: IP address, Port). As used herein, a client 110 can be a computer system that accesses a (remote) service on another computer via a network, or other suitable device, where the remote user 20 can connect to a service operating on a remote system through the Internet protocol (IP) suite. For example, the client 110 can be a Web browser that connects to a web server and retrieves web pages for display.

It can be appreciated that according to one embodiment, the mail proxy 12, when authenticating users 20 and/or clients 110, the mail proxy 12 can also retrieve additional information from the authentication and authorization server 14 (e.g. LDAP, RADIUS etc.) regarding the outgoing and incoming e-mail servers 120, 130 associated with the ISP 100. For example, the additional information from the authentication and authorization server 14 can include, which physical e-mail servers 120, 130 (from a plurality of e-mail servers 122, 124, 126, 132, 134, 136 that the VPN device 10 can front) the user 20 or client device 110 needs to be directed. In addition, a network administrator can include or add specific e-mail server 120, 130 information in the centralized authentication or authorization databases 16 of the VPN device 10, such that each remote user 20 or client 110, can be assigned to a specific incoming server 120 and outgoing server 130. The incoming servers 130 and outgoing servers 120 are selected from a group or plurality of incoming servers 122, 124, 126 and outgoing servers 132, 134, 136.

In addition, the mail proxy 12 can be configured, such that when a remote user's 20 data is moved to a different e-mail server 120, 130 (i.e., another physical machine), it can be performed by a network administrator without having to contact the remote user 20. For example, if an e-mail server 120, 130 needs to be taken off line for maintenance purposes, the remote user's 20 or client's 110 e-mail can be moved to another server 120, 130 or re-routed by simply changing the e-mail servers IP addresses and port in the authentication and authorization server database 16. Accordingly, if the remote user's 20 data is moved to a new server 120, 130, the re-routing information does not need to be communicated to the remote user 20.

Alternatively, it can be appreciated that each remote user 20 and/or client or client device 110 can be assigned to one or more incoming servers 132, 134, 136 and outgoing servers 122, 124, 126. For example, a remote user 20, client, or client device 110 can be assigned primary and secondary incoming servers 130 and outgoing servers 120. Thus, if the primary server 120, 130 is down or needs to be taken offline, the secondary server 120, 130 provides the needed functionality without the need for the network administrator to re-route e-mail traffic to an alternative server 120, 130. Rather, the alternative servers 120, 130 are specified in the database 16 for SMTP traffic and IMAP traffic. Alternatively, if a secondary server 120, 130 is not designated, the AAA server 14 via the mail proxy 12 module can configured to automatically or randomly select a second e-mail server 120, 130 from the one or more incoming and outgoing servers 122, 124, 126, 132, 134, 136.

Furthermore, the remote users 20 and/or client or client devices 110 can be distributed across several e-mail servers 120, 130 without each server 120, 130 having to maintain data about each remote user 20. For example, the remote users 20 or clients 110 can be assigned to one or more e-mail servers 120, 130, which can provide improved performance by allowing the VPN device 10 to handle a larger number of e-mail sessions than the VPN device 10 would normally be able to handle. Thus, the e-mail system can be configured with several smaller servers 120, 130 rather than one larger server 120, 130. In addition, the system provides a considerable amount of flexibility in the management of user data, since remote users and their associated information can be moved from one server to another, simply by altering the users 20 information in the user database 16.

Figure 4:
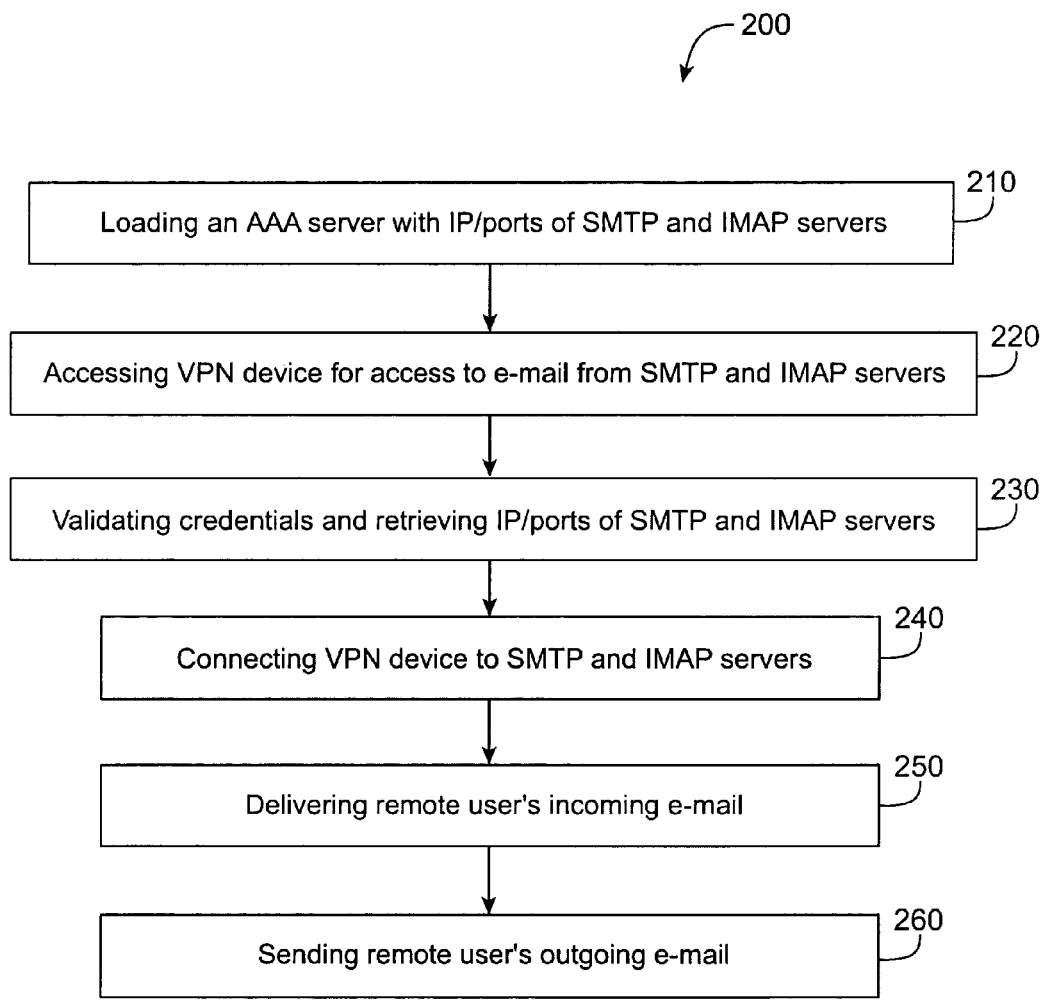
FIG. 4 shows a flow diagram of a load distribution system and method using a mail proxy of a virtual private network device according to another embodiment.

FIG. 4 shows a flow diagram of a load distribution system and method using a mail proxy of a virtual private network device 200 according to another embodiment. As shown in FIG. 4, the administrator of the corporate network 30 loads (or likely already has this data) their authentication or authorization databases with an IP address and Port for the e-mail servers 120, 130, (SMTP and IMAP), with includes one IP Address/Port for each protocol 210. In this particular embodiment, the VPN device 10 via the mail proxy 12 having an authentication and authorization module or service acts as the e-mail server for the remote user 20 or client 110 (for IMAP and SMTP access). The mail proxy 12 via the authentication and authorization module validates the credentials of the client, and routes the e-mail request of the client to at least one outgoing e-mail server 120 (SMTP) and at least one incoming e-mail server 130 (IMAP). The network administrator can also provide the IP address and Port of the SMTP and IMAP server 120, 130 for each remote user 20 and/or client or client device 110.

In order to retrieve and/or send an e-mail, the remote user 20 and/or client or client device 110 accesses the VPN device 10, which includes access to the representative SMTP and IMAP servers 120, 130. The remote user 20 via the client or client device 110 can access 220 their e-mail via the VPN device 10, where the user 20 is presented with a dialogue box, which requires the remote user 20 to enter a set of credentials (username and password). The AAA module or service of the mail proxy 12 of the VPN 10 validates 230 the credentials and retrieves any additional authorization attributes from the database 16. These attributes can include an IP address and Port of the outgoing (SMTP) server 120 and an IP address and Port of the incoming (IMAP) server 130 that has the remote user's 20 e-mail data. The VPN device 10 uses the IP address and Port as retrieved and connects to the outgoing server 120 (SMTP) or incoming server 130 (IMAP) 240. The remote users' 20 incoming mail is delivered 250 to the remote user 20 and/or client or client device 110, and the remote user's outgoing mail is sent out 260.

The above are exemplary modes of carrying out the invention and are not intended to be limiting. It will be apparent to those of ordinary skill in the art that modifications thereto can be made without departure from the spirit and scope of the invention as set forth in the following claims.

What is claimed is:

1. A system for load distribution using a mail proxy comprising:
   a plurality of remote users;
   a public network; and
   a private network, the private network comprising:
      a plurality of outgoing e-mail servers and a plurality of incoming e-mail servers within the private network; and
      a virtual private network (VPN) device, wherein the VPN device establishes a secure connection between the remote user and the VPN device by validating a credential of the remote user and prevents unauthorized access to the private network, the VPN device including a mail proxy, which performs the steps of:
         validating credentials of the remote users;
         distributing e-mail requests of the remote users to and from at least one outgoing e-mail server and at least one incoming e-mail server; and
         assigning the remote users to one or more of the outgoing e-mail servers and one or more of the incoming e-mail servers from the plurality of outgoing e-mail servers and the plurality of incoming e-mail servers.

2. The system of claim 1, wherein distributing e-mail requests of the remote users comprises retrieving an internet protocol (IP) address and Port for the one or more outgoing e-mail server and the one or more incoming e-mail server from an authentication and authorization server.

3. The system of claim 2, wherein the authentication and authorization server includes a database entry for each of the remote users, the database entry having a plurality of IP addresses and Ports associated with the plurality of incoming e-mail servers and the plurality of outgoing e-mail servers.

4. The system of claim 1, wherein the plurality of outgoing e-mail servers support an SMTP protocol.

5. The system of claim 1, wherein the plurality of incoming e-mail servers support an IMAP protocol.

6. The system of claim 1, further comprising an authentication and authorization server associated with the virtual private network device, the authentication and authorization server including a database, which includes information regarding the plurality of incoming e-mail servers and the plurality of outgoing e-mail servers.

7. The system of claim 1, wherein the private network is an intranet.

8. The system of claim 1, wherein each remote user is assigned a primary incoming server, a primary outgoing e-mail server, a secondary incoming e-mail server, and a secondary outgoing e-mail server.

9. The system of claim 8, wherein the mail proxy allows for distribution of an incoming or an outgoing e-mail to the secondary incoming e-mail server or the secondary outgoing e-mail server, and wherein the distribution of the incoming or the outgoing e-mail is performed by a network administrator, without notifying the remote user.

10. The system of claim 8, further comprising randomly selecting the second incoming e-mail server for each of the plurality of remote users from the plurality of incoming e-mail servers within the private network, which are accessible via the virtual private network device.

11. The system of claim 1, the mail proxy distributes the plurality of remote users among the plurality of outgoing e-mail servers and the plurality of incoming e-mail servers without each of the plurality of outgoing e-mail servers and the plurality of incoming e-mail servers having to maintain data about each of the plurality of remote users.

12. The system of claim 1, further comprising distributing the e-mail requests of the remote users to the one or more incoming e-mail servers using a load distribution method, which distributes the e-mail requests of the remote users across several of the plurality of incoming e-mail servers.

13. The system of claim 12, further comprising distributing the e-mail requests of the remote users to one or more outgoing e-mail servers using a load distribution method, which distributes the e-mail requests of the remote users across several of the plurality of outgoing e-mail servers.

14. A virtual private network device having enhanced load distribution using a mail proxy, the device comprising:
   a cryptographic protocol, which provides a secure connection between the virtual private network device and a remote user on a public network;
   a mail proxy adapted to receive and distribute SSL and clear-text e-mails between a remote user and an e-mail server, the e-mail server comprising a plurality of outgoing e-mail servers and a plurality of incoming e-mail servers, and wherein the mail proxy assigns the remote user to one or more outgoing e-mail servers and one or more incoming e-mail servers, and distributes the e-mail requests of the remote user to the one or more outgoing e-mail servers and one or more incoming e-mail servers using a load distribution method, which distributes the e-mail requests of the remote user across several of the one or more outgoing servers and several of the one or more incoming e-mail servers; and
   an authentication, authorization and accounting server, the authentication, authorization and accounting server having a database, which includes:
      authentication and authorization credentials; and
      information regarding the outgoing e-mail servers and the incoming mail servers for the remote user.

15. A method of load distribution for a virtual private network device, the method comprising performing the following steps within the virtual private network device:
   establishing a secure connection between the virtual private network device and a remote user;

assigning the remote user to one or more outgoing e-mail servers and one or more incoming e-mail servers from a plurality of outgoing e-mail servers and a plurality of incoming e-mail servers;

receiving an encrypted e-mail request from the remote user having a set of credentials;

directing the set of credentials of the remote user to an authentication and authorization module within the mail proxy, wherein the authentication and authorization module:

validates the set of credentials of the remote user; and provides an IP address and Port of at least one outgoing e-mail server and at least one incoming e-mail server for the remote user based on a database stored within an authentication and authorization server;

decrypting an outgoing e-mail sent by the remote user and sending the e-mail via an outgoing e-mail server; and receiving incoming e-mails from an incoming mail server and delivering the e-mail to the remote user over an encrypted channel.

16. The method of claim 15, further comprising placing user specific e-mail server information on the authentication and authorization server.

17. The method of claim 15, wherein the authentication and authorization module allows for re-distribution, wherein a remote user's at least one outgoing and at least one incoming e-mail servers can be changed by a network administrator, without notifying the remote user.

18. The method of claim 15, wherein the at least one outgoing e-mail server and the at least one incoming e-mail servers comprise a plurality of IMAP servers and a plurality of SMTP servers.

19. The method of claim 18, wherein the authentication and authorization server further provides attributes to the e-mail request for distributing the e-mail request to at least one IMAP server and at least one SMTP servers, wherein the attributes include at least one IP address and Port for each of the IMAP and the SMTP servers.

20. The method of claim 15, wherein the authentication and authorization module is contained within the virtual private network device, which is acting as an e-mail server.

21. The method of claim 15, wherein the mail proxy further performs the steps of:

assigning the remote user to one or more incoming e-mail servers; and distributing the e-mail requests of the remote user to the one or more incoming e-mail servers and one or more outgoing e-mail servers using a load distribution method, which distributes the e-mail requests of the remote users across several of the plurality of incoming e-mail servers.

22. A method of load distribution using a mail proxy of a virtual private network (VPN) device comprising:

establishing a secure connection between the virtual private network device and at least one remote user;

assigning the at least one remote user to one or more of the IMAP servers and one or more of the SMTP servers from a plurality of IMAP servers and a plurality of SMTP servers;

inputting into an authentication and authorization database an IP address and Port for IMAP and SMTP access for the at least one remote user; and directing e-mail request to at least one of a plurality of IMAP and SMTP servers based on the authentication and authorization database to at least one of a plurality of IMAP and SMTP servers, wherein the database provides the IP address and Port for the IMAP server and the SMTP server, and which are provisioned to the at least one remote user.

23. The method of claim 22, wherein the at least one remote user further accesses an e-mail at a remote location by:

accessing an e-mail account via the VPN device;

authenticating and authorizing the remote user;

retrieving additional authorization attributes from a database, wherein the attributes include the IP address and Port of the outgoing (SMTP) server and the IP address and Port of the incoming server (IMAP) that has the at least one remote user's e-mail data; and sending a response to the at least one remote user from the remote user's e-mail data.

\* \* \* \* \*